(12) United States Patent
Stoussavljewitsch et al.

(10) Patent No.: US 12,323,523 B2
(45) Date of Patent: Jun. 3, 2025

(54) SYSTEM, METHOD AND APPARATUS FOR PERFORMING CRYPTOGRAPHICALLY SECURED TRANSACTIONS

(71) Applicant: YOUKI GmbH, Amberg (DE)

(72) Inventors: Martin Stoussavljewitsch, Poppenricht (DE); Michael Stoussavljewitsch, Poppenricht (DE)

(73) Assignee: YOUKI GmbH, Amberg (DE)

( * ) Notice: Subject to any disclaimer, the term of this patent is extended or adjusted under 35 U.S.C. 154(b) by 563 days.

(21) Appl. No.: 17/279,051

(22) PCT Filed: Sep. 12, 2019

(86) PCT No.: PCT/EP2019/074326
§ 371 (c)(1),
(2) Date: Mar. 23, 2021

(87) PCT Pub. No.: WO2020/064346
PCT Pub. Date: Apr. 2, 2020

(65) Prior Publication Data
US 2022/0078014 A1    Mar. 10, 2022

(30) Foreign Application Priority Data
Sep. 24, 2018   (EP) ..................... 18196164

(51) Int. Cl.
*H04L 9/32* (2006.01)
*G06Q 20/40* (2012.01)
(Continued)

(52) U.S. Cl.
CPC ........... *H04L 9/321* (2013.01); *G06Q 20/401* (2013.01); *H04L 67/12* (2013.01); *H04L 9/50* (2022.05)

(58) Field of Classification Search
CPC ........... H04L 9/321; H04L 9/50; H04L 67/12; G06Q 20/401; G06Q 50/06; G06Q 30/06
See application file for complete search history.

(56) References Cited

U.S. PATENT DOCUMENTS

| | | |
|---|---|---|
| 2011/0296169 A1 | 12/2011 | Palmer |
| 2016/0284033 A1 | 9/2016 | Winand et al. |

(Continued)

FOREIGN PATENT DOCUMENTS

| | | |
|---|---|---|
| CN | 108009917 A | 5/2018 |
| EP | 3 193 299 A1 | 7/2017 |

OTHER PUBLICATIONS

Office Action mailed May 17, 2021, in corresponding European Application No. EP18196164.0, filed Sep. 24, 2018, 17 pages.
(Continued)

*Primary Examiner* — Sangseok Park
(74) *Attorney, Agent, or Firm* — CHRISTENSEN O'CONNOR JOHNSON KINDNESS PLLC

(57) ABSTRACT

A system for performing transactions between at least a first and at least a second transaction partner, comprising a plurality of computing and communication units, which are provided in a locally distributed manner at a plurality of locations, each computing and communication unit being coupled to at least one measuring sensor, the computing and communication units forming a computer group for performing a transaction, wherein the computing and communication units are designed to generate a data set which contains information with regard to a transaction and is designed to be incorporated into a chain of cryptographically interlinked data sets; at least one validation unit designed to verify the data sets that shall be incorporated into the chain of cryptographically interlinked data sets, wherein the validation unit is further designed to select a data set which has
(Continued)

been generated and incorporate it into the chain of cryptographically interlinked data sets.

14 Claims, 2 Drawing Sheets

(51) Int. Cl.
*H04L 67/12* (2022.01)
*H04L 9/00* (2022.01)

(56) References Cited

U.S. PATENT DOCUMENTS

| | | | |
|---|---|---|---|
| 2017/0206522 A1* | 7/2017 | Schiatti | G06Q 20/3829 |
| 2017/0352031 A1* | 12/2017 | Collin | G06Q 20/38 |
| 2018/0096360 A1* | 4/2018 | Christidis | H04L 9/0643 |
| 2020/0005403 A1* | 1/2020 | Patterson | G07F 13/00 |
| 2020/0119926 A1* | 4/2020 | Buki | G06Q 20/401 |
| 2020/0204346 A1* | 6/2020 | Trevethan | H04L 9/0637 |
| 2020/0328889 A1* | 10/2020 | Matetic | H04L 9/32 |
| 2021/0218554 A1* | 7/2021 | Balinsky | G06F 21/6209 |

OTHER PUBLICATIONS

Office Action mailed Feb. 17, 2023, issued in corresponding European Application No. EP18196164.0, filed Sep. 24, 2018, 17 pages.
"Requirements for the interoperability of the Communication unit of an intelligent measuring system", Technical Guideline BSI TR-03109-1 , Federal Office for Security in Information Technology, Bonn, Germany, Mar. 18, 2013 (German version), pp. 1-146.
V. Buterin, "On Public and Private Blockchains," retrieved from the Internet: https://blog.ethereum.org/2015/08/07/on-public-and-private-blockchains [retrieved on Dec. 19, 2018], Aug. 6, 2015, 6 pages.
C. Torr, "Using Established, Proven Standards to Build a Secure Smart Meter Infrastructure," retrieved from the Internet: https://www.multos.com/uploads/Using_Established_Proven_Standards_to_Build_a_Secure_Smart_Meter_Infrastructure.pdf [retrieved on Feb. 22, 2019], Feb. 2, 2017, 12 pages.
Extended European Search Report mailed Mar. 7, 2019, issued in corresponding European Application No. EP18196164.0, filed Sep. 24, 2018, 13 pages.
Office Action mailed Nov. 22, 2024 issued in corresponding European Application No. 18196164.0 filed Sep. 24, 2018, 16 pages.
Office Action mailed Jan. 26, 2024 issued in corresponding Chinese Application No. 201980062379 filed Sep. 12, 2019, 13 pages.

* cited by examiner

SYSTEM, METHOD AND APPARATUS FOR PERFORMING CRYPTOGRAPHICALLY SECURED TRANSACTIONS

FIELD

The present disclosure relates to a system, a method and a computing and communication unit for performing cryptographically secured transactions between a first and a second transaction partner.

BACKGROUND

Systems for performing cryptographically secured transactions are already known from the prior art. In particular, cryptocurrency systems on the basis of blockchain technology are known. In this case, a transaction is represented by a data set, this data set being incorporated into a data set chain in such a way that the data sets of the data set chain are cryptographically linked to one another. This cryptographic link is preferably achieved in that, in addition to the transaction data, the data set also contains a cryptographically secure hash of the preceding block and preferably a time stamp.

The security with this type of blockchain technology is achieved in that, due to the cryptographic linkage of the data sets to one another and the computing power required for falsification, it is not possible to falsify an individual data set. To falsify a data set, at least part of the chain from the falsified data set would have to be recalculated to the present, but this is virtually impossible for reasons of computing capacity and impracticable for economic reasons.

SUMMARY

Based on this, an object of the present disclosure is to provide a system for performing transactions between a first and a second transaction partner, which ensures cryptographically secure transactions to be performed when limited hardware resources are used.

This object is achieved by a system according to the features of one or more embodiments described herein. A method for performing transactions between a first and a second transaction partner and a computing and communication unit for calculating a data set of such a transaction are also described.

According to a first aspect, the present disclosure relates to a system for performing transactions between at least a first and at least a second transaction partner. The system comprises a plurality of computing and communication units provided in a locally distributed manner at a plurality of locations, each computing and communication unit being coupled to at least one measuring sensor, for example a power consumption measuring sensor. In particular, each computing and communication unit is part of a so-called smart meter gateway or forms such a smart meter gateway. The multiple computing and communication units here form a computer group for performing a transaction. When performing a transaction, the computing and communication units of a computer group are each designed to generate a data set which contains information relating to a transaction and is designed to be incorporated into a chain of cryptographically interlinked data sets (hereinafter also referred to as a data set chain). For example, the data set can be designed to be incorporated in a so-called blockchain in which the blocks are cryptographically linked to one another as data sets. In particular, the computing and communication units of the computer group are in competition with one another, i.e. a plurality of computing and communication units of the computer group, in particular each computing and communication unit of the computer group, calculates independently of the others a data set that represents the transaction to be performed and attempts to have the data set calculated by it incorporated into the chain of cryptographically interlinked data sets in order to document the transaction. Preferably, the computing and communication unit which has a data set that is incorporated into the data set chain, receives remuneration.

Furthermore, the system comprises at least one validation unit that is designed to verify the data sets that shall be incorporated into the chain of cryptographically interlinked data sets. In other words, the validation unit thus checks whether a data set that shall be inserted into the chain of cryptographically interlinked data sets has been formed correctly (correctly in the sense of existing rules and without falsification) and is thus suitable for being incorporated into the chain of cryptographically interlinked data sets. The validation unit is further designed to select a data set generated by a computing and communication unit of the computer group and to incorporate it into the chain of cryptographically interlinked data sets. Thus, the validation unit decides which data set of the data sets calculated by the computing and communication units competing with one another shall be incorporated into the chain of cryptographically interlinked data sets.

Preferably, the data set is encrypted by the computing and communication unit to protect it during the transmission to the validation unit. In particular, the data set is encrypted, for example, with a private key of the respective computing and communication unit.

The system according to the present disclosure offers the decisive advantage that by using a validation unit, the number of computing and communication units in a computer group can be kept limited, for example less than 200 computing and communication units, without thereby jeopardizing the authenticity of the chain of cryptographically interlinked data sets, since the validation unit verifies or ensures that the data sets calculated by the computing and communication units are correctly formed. In addition, the computing and communication units, as units that are part of a measuring sensor architecture, form a high-level authenticity, since these computing and communication units are preferably certified and can only be accessed via a specially secured access.

In the event that the computing and communication unit is part of a smart meter gateway or forms such a smart meter gateway, reference is made to the technical guideline of the Federal Office for Information Security (BSI) TR-03109-1, version 1.0 on this smart meter gateway, which is incorporated by reference herein in its entirety.

According to one exemplary embodiment, the transaction partners are assigned to different zones, at least one validation unit being assigned to each zone. The same or at least partially different validation units can be assigned to the zones of the transaction partners. A plurality of computing and communication units can be assigned to each zone, i.e. the computing and communication units are also assigned to the respective transaction partners via the respective zones. Preferably, different computing and communication units are assigned to the respective transaction partners in each case. Thus, an at least partial physical separation between the computing and communication units that calculate the respective data sets can be achieved by means of the zones.

According to one exemplary embodiment, the transaction partners are assigned to different zones, at least two validation units being assigned to each zone, a first validation unit being designed to verify the data sets that shall be incorporated into the chain of cryptographically interlinked data sets and the at least one further validation unit being designed to check the first validation unit. Preferably, more than two validation units are assigned to each zone, one of the validation units as the first validation unit being configured to verify a data set that shall be incorporated and the further validation units verifying this first validation unit. In this way, a high level of authenticity of the system can be ensured.

Preferably, the validation units that are assigned to a respective zone are in competition with one another. In other words, all validation units compete for the right to verify the data set that shall be incorporated into the chain of cryptographically interlinked data sets. Preferably, the verification of a data set to be verified is coupled to remuneration, in particular a monetary remuneration, and only the validation unit that is selected to verify the data set that shall be incorporated thus receives remuneration.

According to one exemplary embodiment, each computing and communication unit has an encapsulated area comprising in each case an independent processor and an independent memory unit. Alternatively, independent processor and memory areas are assigned to the encapsulated area, for example in the form of virtual computing environments. This encapsulated area can, for example, form a so-called "sandbox", i.e. an isolated area. It is thus possible to ensure that the computing and communication unit can only access certain resources of a measuring sensor, in particular a smart meter gateway, and cannot access other resources, for example those that calculate and/or store power consumption values.

As a further alternative, the encapsulated area as a whole can be designed as an encapsulated module and can be coupled to the computing and communication unit or the smart meter gateway by plugging it in to exchange information. The exchange of information via the interface is preferably encrypted. Furthermore, information is preferably exchanged via a HAN/CLS interface (HAN: Home Area Network; CLS: Controllable Local System). By plugging in, it is preferably also possible to ensure the power supply of the module. Preferably, the plug-in module is also authenticated with respect to the computing and communication unit or the smart meter gateway. It is likewise preferred that the plug-in also mechanically fixes the module to the computing and communication unit or the smart meter gateway. The interface for supplying the module with information and power can be formed in particular by an elongated contact strip.

The encapsulated module can provide a TCP/IP-based interface via which third-party devices can be coupled to the smart meter gateway. In particular, this TCP/IP-based interface can be used to combine a plurality of smart meter gateways set up at different locations into a computer group in order to perform transactions.

According to one exemplary embodiment, the independent processor or the independent processor section is configured to calculate the data set. Thus, a processor of the measuring sensor is used to calculate directly the data set representing the transaction. In this context, the data set can, for example, comprise cryptographically encrypted information of a preceding, in particular immediately preceding, data set in the data set chain (for example, a hash value of the entire data set or a part thereof), the transaction data, and preferably a time stamp indicating at which point in time the data set was generated. It is understood that this is only an example of the structure of a data set and that it can possibly contain further information, or possibly less information.

According to one exemplary embodiment, the independent memory unit or the independent memory area is designed to store a chain of cryptographically interlinked data sets. In this context, the independent memory unit or the independent memory area can store either the complete data set chain or a part of the data set chain. As a result, not only the new data set that shall be incorporated is calculated in the measuring sensor or the smart meter gateway, but also the data set chain is stored therein.

According to one exemplary embodiment, the at least one validation unit is authorized as a validation unit on the basis of an invested amount of a value carrier or a means of payment. In other words, an operator of a validation unit must invest an amount of a value carrier or a means of payment in order to qualify as a validation unit—in addition to its technical suitability. This invested amount of a value carrier or a means of payment is preferably used as a pledge to ensure that the validation unit correctly verifies the data sets to be checked. Preferably, the invested amount of a value carrier or a means of payment exceeds the individual transactions to be checked by a multiple. In the event that a validation unit performs an incorrect check of a data set that shall be incorporated, it runs the risk of losing the invested amount. This significantly increases the authenticity of the system.

According to one exemplary embodiment, the computing and communication units for performing transactions between at least a first and at least a second transaction partner are freely configurable via an interface. For example, software can be installed on the computing and communication units via the interface, or customization or configuration of the software can be performed. The configuration can here be done via an access control unit, which controls the access to the computing and communication units. As a result, the computing and communication units can be configured for the task they are to perform.

According to one exemplary embodiment, each computing and communication unit is formed to generate a data set in parallel and the validation unit is configured, on the basis of a consensus mechanism considering the data sets generated in parallel, to decide which data set shall be incorporated into the chain of cryptographically interlinked data sets. As a result, it can be decided, e.g. by means of a majority consensus, in connection with which it is assumed that the majority of computing and communication units perform a correct calculation of a data set and possibly by the addition of further criteria, whether the data set has been formed correctly, and, based on this, the incorporation into the data set chain can be performed.

According to a further aspect, the present disclosure relates to a method for performing transactions between at least a first and at least a second transaction partner by means of a system comprising a plurality of computing and communication units provided in a locally distributed manner at a plurality of locations. Each computing and communication unit is coupled to at least one measuring sensor. The computing and communication units form a computer group for performing a transaction. The method here comprises the following steps:

generating at least one data set in each case by the computing and communication units of the computer group when a transaction is performed, the data set containing information relating to the transaction and being designed to be incorporated into a chain of cryptographically interlinked data sets;

verifying the data set that shall be incorporated into the chain of cryptographically interlinked data sets by at least one validation unit;

selecting a data set generated by a computing and communication unit of the computer group, and incorporating the selected data set into the chain of cryptographically interlinked data sets.

According to one exemplary embodiment of the method, the step of verifying the data set to be incorporated into the chain of cryptographically interlinked data sets includes that, on the basis of a consensus mechanism considering the data sets generated in parallel, the validation unit decides which data packet shall be incorporated into the chain of cryptographically interlinked data sets. As a result, it can be decided, e.g. by means of a majority consensus, in connection with which it is assumed that the majority of computing and communication units perform a correct calculation of a data set and possibly by the addition of further criteria, whether the data set has been formed correctly, and, based on this, the incorporation into the data set chain can be performed.

According to one exemplary embodiment of the method, the validation unit is verified by at least one further validation unit and, in the event of incorrect validation, the validation unit loses an invested amount of a value carrier or a means of payment that was used for the authorization as a validation unit. Preferably, the invested amount of a value carrier or a means of payment exceeds the value of the individual transactions to be checked by a multiple. This substantially increases the authenticity of the system with a limited number of computing and communication units in the computer group.

According to one exemplary embodiment of the method, the incorporation of the selected data set into the chain of cryptographically interlinked data sets comprises: generating a cryptographically secured hash value of at least a part of the data set immediately preceding it in the chain of data sets, a time stamp, and information about the transaction performed. Thus, a linkage of the data sets within the chain of data sets can be achieved, which leads to a substantial increase in the authenticity of the method.

According to one exemplary embodiment of the method, the computing and communication unit has in each case an encapsulated area comprising either an independent processor and an independent memory unit, or independent processor and memory areas are assigned to the encapsulated area. A chain of cryptographically interlinked data sets is stored in the independent memory unit or the independent memory area of the computing and communication unit. This allows the measuring sensor or smart meter gateway to be used both for calculating the data set that shall be incorporated and for storing the data set chain.

"Transaction" in the sense of the present disclosure is understood to mean any process in which a value exchanged between transaction partners is documented. This can be, in particular, an amount of a value carrier or a means of payment, an energetic measured value, for example an energy consumption value or an energy delivery value, etc.

In the sense of the present disclosure, the expressions "approximately", "substantially" or "about" mean deviations from the respective exact value by +/−10%, preferably by +/−5% and/or deviations in the form of changes that are insignificant for the function.

Further developments, advantages and possible applications of the present disclosure also result from the following description of exemplary embodiments and from the drawings. In this connection, all the features described and/or depicted are in principle the subject matter of the present disclosure, either individually or in any combination, irrespective of their summary in the claims or their back-reference. Also, the content of the claims is made a part of the description.

BRIEF DESCRIPTION OF THE DRAWINGS

The present disclosure is explained in more detail below with reference to the drawings, using exemplary embodiments, wherein.

DETAILED DESCRIPTION

Figure 1:
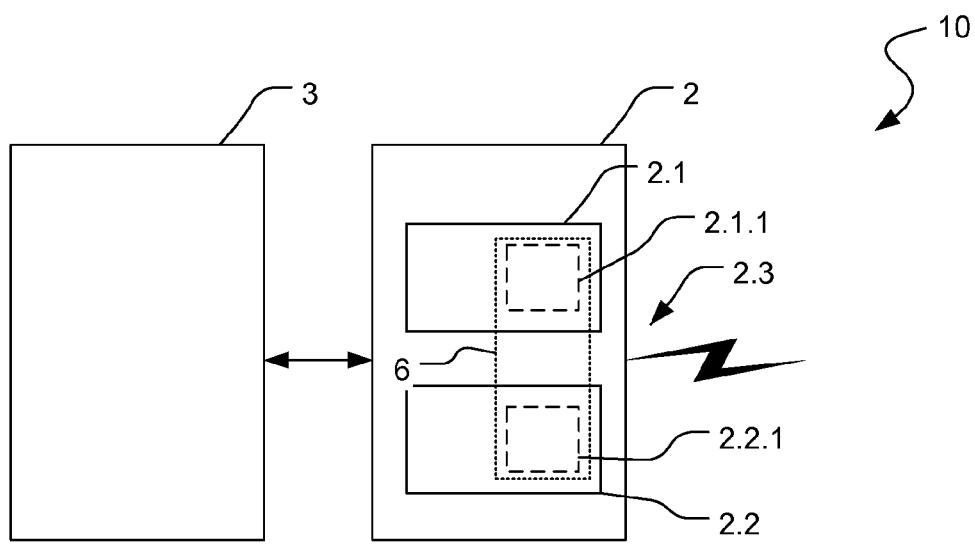
FIG. 1 shows by way of example a schematic representation of an arrangement of a computing and communication unit coupled to a measuring sensor.

FIG. 1 shows, by way of example and in a roughly schematic manner, a computing and communication unit 2 coupled to a measuring sensor 3. The computing and communication unit 2 is e.g. a so-called smart meter gateway which receives measurement data from the measuring sensor 3, for example an electricity meter, stores them and, if necessary, processes them in order to forward the measurement data or information derived therefrom (for example by means of the above mentioned processing) to an information receiver. Information receivers of this type can be, for example, a billing office, a utility company, etc. Thus, the computing and communication unit 2 forms a kind of gateway, so to speak, for the communication of the measuring sensor 3 to the outside.

The computing and communication unit 2 is preferably arranged in the immediate local vicinity of the measuring sensor 3. The computing and communication unit 2 can, for example, be provided in a consumption point, in particular a building, in which the measuring sensor 3 is also located.

The computing and communication unit 2 has at least one processor 2.1 for performing computing operations and a memory unit 2.2 for storing data.

In order to perform transactions between at least two transaction partners and to calculate data sets required for this purpose, an encapsulated area 6 is provided, which is shown in FIG. 1 by a dotted rectangle. This encapsulated area 6 forms a so-called "sandbox", i.e. an isolated area, so that the computing and storage processes in this encapsulated area 6 do not have any effect on the other processes (for example acquisition and evaluation of measurement data) which are processed outside the encapsulated area 6 by the computing and communication unit 2. Alternatively, the encapsulated area 6 can be designed as a plug-on module, as described above.

In particular, a processor area 2.1.1 of the processor 2.1 and a memory area 2.2.1 of the memory unit 2.2 can be assigned to the encapsulated area 6, so that the encapsulated area 6 basically accesses the same hardware that is also used for the other processes processed in the computing and communication unit 2 (for example, acquisition and evaluation of measurement data). However, virtual separation is achieved by assigning to the encapsulated area 6 a different processor area 2.1.1 (for example, a processor core of a multi-core processor) and a different memory area 2.2.1 (different memory addresses) than are assigned to the other processes processed in the computing and communication unit 2. In other words, virtual encapsulation is thus achieved for the processes used to perform the transaction.

Alternatively, the encapsulated area 6 can have its own processor and its own memory unit to which the other processes processed in the computing and communication unit 2 (for example, acquisition and evaluation of measurement data) have no access, so that a physical separation is achieved instead of a virtual separation.

The encapsulated area 6 can also receive measurement data or information derived from measurement data, depending on the configuration of the computing and communication unit 2. This can be done, for example, via an internal data exchange in the computing and communication unit 2 between the encapsulated area 6 and an area that is virtually or physically separated from the encapsulated area 6. Direct access to memory areas in which the measurement data or information derived from measurement data is stored is preferably not possible from the encapsulated area 6.

Furthermore, the computing and communication unit 2 has a communication interface 2.3 via which—as explained in more detail below—data can be sent and received by the computing and communication unit 2.

The computing and communication unit 2 is configured to calculate one or more data sets containing information regarding a transaction. In particular, a data set is a data block that shall be incorporated into a chain of data sets, namely in such a way that the data sets are cryptographically chained to one another to ensure the authenticity of the chain of data sets.

For example, a data set can have cryptographically encrypted information of a preceding, in particular immediately preceding, data set in the data set chain (for example, a hash value of the entire data set or a part thereof), the transaction data, and preferably a time stamp indicating at what point in time the data set was generated.

For generating the time stamp, the computing and communication unit 2 can have access to a clock. In particular, this clock can be an atomic clock, so that the computing and communication unit 2 can, for example, generate a time stamp on the basis of the International Atomic Time (TAI). This allows highly accurate time tagging of the data sets.

Figure 2:
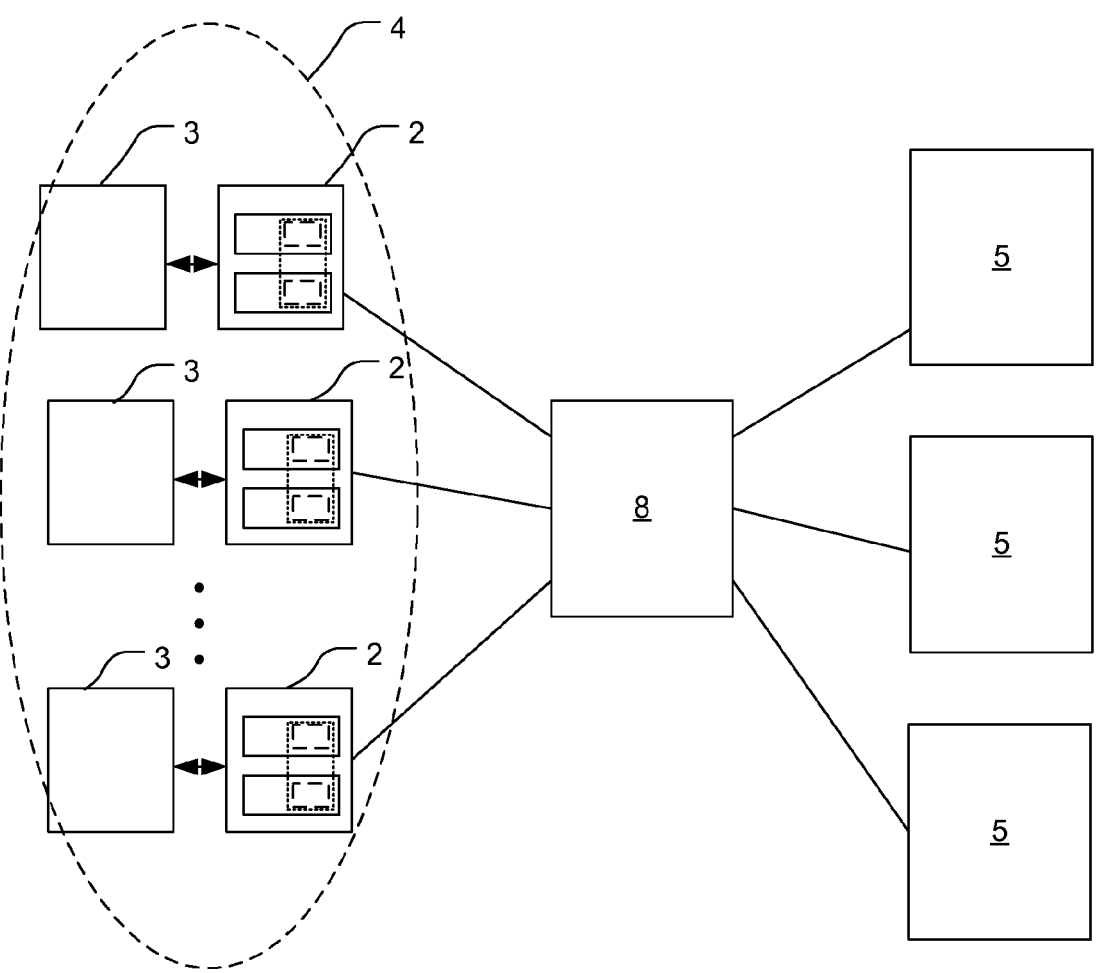
FIG. 2 shows by way of example a schematic representation of a system comprising a plurality of computing and communication units which are coupled to measuring sensors and which are connected to a plurality of validation units via an access control unit.

FIG. 2 shows a system 1 configured to perform transactions between at least two transaction partners.

The system 1 comprises a plurality of computing and communication units 2 each coupled to at least one measuring sensor 2. The computing and communication units 2 form a computer group 4, which are assigned to a transaction partner, for example. The transaction partner can, for example, book system resources in a network of a plurality of computing and communication units 2 for a limited time, so that the transaction partner can complete transactions with another transaction partner through the booked system resources. For example, a transaction can be a payment transaction, a guarantee deposit, a billing transaction, or the like.

The computing and communication units 2 are coupled to one or more validation units 5 through a communication link via one or more access control units 8. Here, all computing and communication units 2 of a computer group 4 can be coupled to the validation units 5 via a single access control unit 8, or computing and communication units 2 are at least partially coupled to the validation units 5 via different access control units 8.

The at least one access control unit 8 is designed to control or monitor the access to the computing and communication units 2. This ensures that only authorized programs, processes or users can access the computing and communication units 2. In addition, access to resources of the encapsulated area 6 is controlled via the access control unit 8. The at least one access control unit 8 thus forms a kind of gateway, so to speak, for the access to the resources provided by the computing and communication units 2.

System 1 further comprises at least one, preferably a plurality of validation units 5. In particular, two or more validation units 5 are assigned to a computer group 4.

After receiving information regarding a transaction to be performed, a data set is calculated in each case by the encapsulated area of the computing and communication units 2 of the computer group 4 assigned to a transaction partner. As already explained above, a data set preferably contains a cryptographically secure link to a data set preceding, in particular immediately preceding, in the data set chain as well as information about the transaction. Preferably, a time stamp is also provided in the data set. The computing and communication units 2 each compute, preferably in parallel or quasi-parallel, a data set reflecting the transaction at a time.

After the calculation, the computing and communication units 2 of the computer group 4 each send the data set they have calculated for the transaction to one or more validation units 5 via the access control unit 8. In the process, the data set is preferably encrypted, for example with a private key of an asymmetric encryption method. At least one of the validation units 5 checks the data sets provided by different computing and communication units 2 of the computer group 4 and then decides which data set is incorporated into the chain of data sets.

When checking the data sets, the validation unit 5 preferably uses a consensus mechanism, i.e. on the basis of multiple data sets calculated for this transaction by the computing and communication units 2, the validation unit 5 decides whether a particular data set has been correctly formed and thus can be inserted into the chain of data sets. This technology is also known as blockchain technology.

In the case of multiple validation units 5, i.e. at least a first validation unit 5 that performs the validation of the data sets and at least one further validation unit 5, the at least one further validation unit 5 assumes a control function for the first validation unit 5. In this connection, the at least one further validation unit 5 checks whether the first validation unit 5 correctly checks the data set that shall be incorporated and then correctly incorporates this correctly checked data set into the data set chain.

In order to qualify as a validation unit 5, this unit or its operator must deposit an amount of a value carrier or means of payment, for example an amount of money, as an investment. This investment preferably exceeds the value of a transaction to be carried out by a multiple. In the event that the at least one further validation unit 5 determines that the first validation unit 5 does not correctly check one or more data sets or does not correctly incorporate them, the latter's suitability as a validation unit 5 can be withdrawn and the deposited investment can be retained. Thus, even with a limited number of computing and communication units 2, which also have limited computing power, a high level of authenticity and integrity of the data sets incorporated into the data set chain can be achieved.

Preferably, the computing and communication units 2 of the computer group 4 are designed to store at least sections of the chain of data sets. This achieves distributed storage of the data set chains in a number of computing and communication units 2, so that sufficient data security is ensured even in the event of failure of a computing and communication unit 2.

Figure 3:
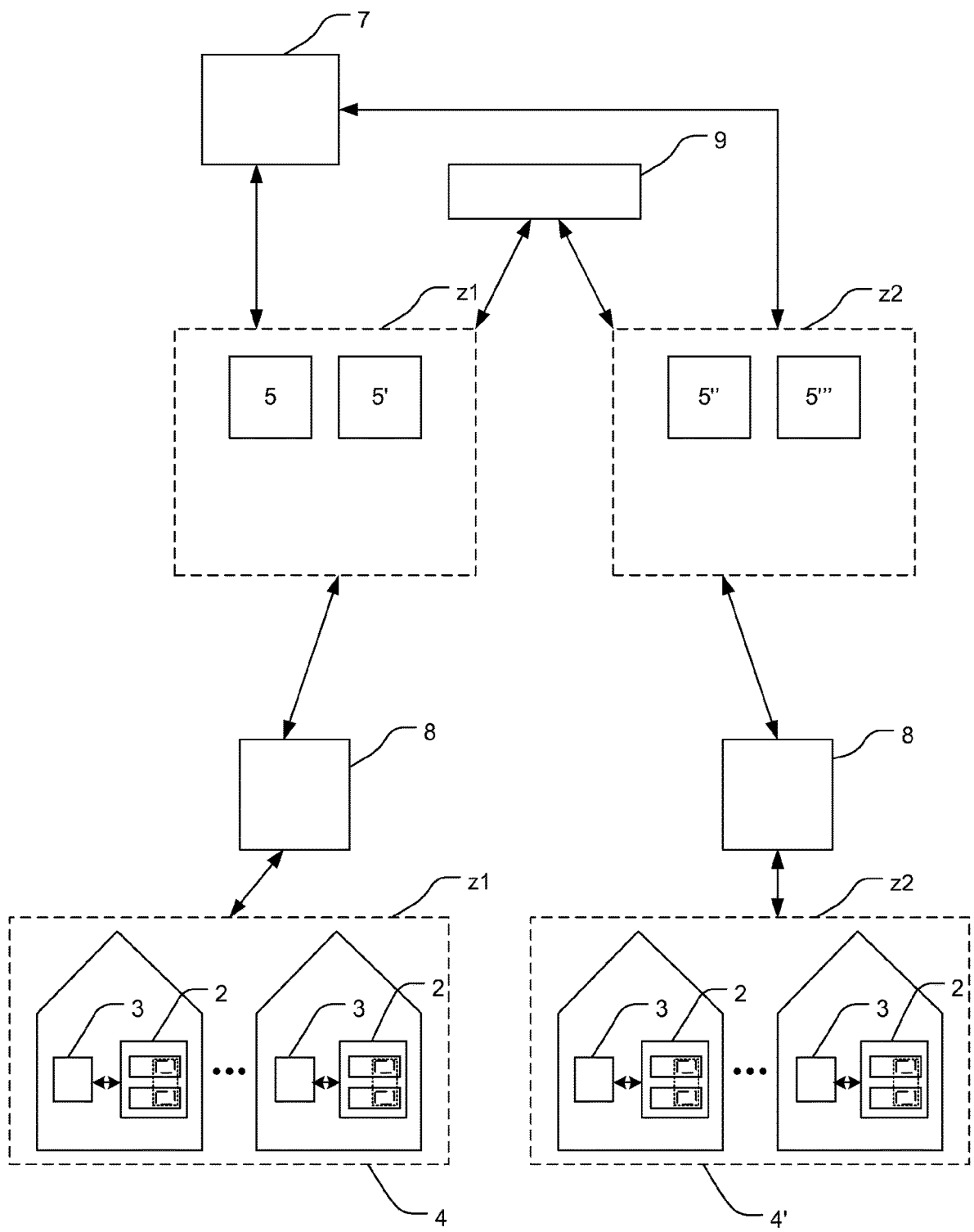
FIG. 3 shows by way of example a block diagram of a system for performing transactions between a plurality of transaction partners to which computer groups or validation units arranged in zones are assigned.

FIG. 3 shows a block diagram illustrating the functional relationships of the system described above or of a method for performing transactions between at least two or more transaction partners.

The transaction partners are each assigned a zone z1, z2 and a respective computer group 4, 4', each computer group 4, 4' comprising a plurality of computing and communication units 2. The computing and communication units 2 of a computer group 4 are designed, as already described above, to calculate one or more data sets that shall be incorporated into a data set chain. For example, if a first transaction partner to which zone z1 and computer group 4 is assigned wishes to perform a transaction to a second transaction partner to which zone z2 and computer group 4' is assigned, the computer group 4 calculates a data set containing information about the transaction to be performed, in particular about the transaction type and the transaction total.

Preferably, a plurality of validation units 5, 5' are assigned to zone z1. Preferably, more than two validation units 5, 5' are also assigned to zone z1. These validation units 5, 5' are designed, as described above, to check the data sets with regard to their correct formation or completeness. For example, the validation units 5, 5' are in competition with one another with regard to the checking activity of the data sets. For example, remuneration is offered for the validation activity, and only the validation unit that performs a data set validation is remunerated for this validation activity.

The at least one further validation unit 5' of zone z1 checks the validation activity of the validation unit 5 and thereby forms a verification instance.

After a data set that shall be incorporated into the data set chain has been validated by the validation unit 5 and this validation has been verified for correctness and/or completeness by at least one further validation unit 5, the data set is incorporated into the data set chain and the data set chain is stored in one or more computing and communication units 2 of the computer group 4.

In order to inform a second transaction partner that the transaction has been performed successfully, information is exchanged between zone z1 and zone z2, in particular between a validation unit 5, 5' of zone z1 and a validation unit 5', 5'' of zone z2. In this context, one or more validation units can be active in both zone z1 and zone z2 where they act as validators.

Instead of the transmission of information, an amount of a value carrier or means of payment (for example, in the form of tokens) can also be transmitted.

The exchange of information or the transmission of an amount of a value carrier or means of payment can be carried out, for example, via an interface unit 9. This can be done, for example, in such a way that the validation unit 5 of zone z1, which has validated the data set, informs a validation unit of zone z2 that the incorporation of the data set into the data set chain and thus the transaction has been correctly completed. Alternatively, instead of an exchange of information via the interface unit 9, it is also possible to transmit an amount of a value carrier or means of payment to a validation unit 5'', 5''' of zone z2. As another alternative, a validation unit 5 can guarantee the execution of the transaction.

Furthermore, the interface unit 9 can form an interface to a cryptocurrency system (e.g., Bitcoin, Ethereum, etc.) or another bank transfer system, so that a transaction in a cryptocurrency or another currency can be performed between the transaction partners or the zones z1, z2 assigned to these transaction partners. The interface unit 9 here ensures that a technology-independent exchange of information, which also includes currency exchanges, can take place between the system 1 and any other transaction or trading systems.

The system 1 also preferably comprises a customer interface 7. Via this customer interface 7, customers can, for example, allocate hardware resources, in particular a plurality of computing and communication units 2 and validation units 5. In addition, the customer interface 10 can be used to configure the hardware resources, for example according to customer-specific specifications. For example, software can be loaded onto the computing and communication units 2 via the customer interface 7, or software present on the computing and communication units 2 can be configured.

The invention has been described above by means of exemplary embodiments. It is understood that numerous changes and modifications are possible without departing from the inventive concept underlying the invention.

The invention claimed is:

1. A system for performing transactions between at least a first and at least a second transaction partner, comprising
   a plurality of computing and communication units, which are provided in a locally distributed manner at a plurality of locations, each computing and communication unit being coupled to at least one measuring sensor and forming a smart meter gateway or being a part of a smart meter gateway for communication by the at least one measuring sensor with an information receiver, the computing and communication units forming a computer group for performing a transaction, wherein, when performing a transaction, the computing and communication units of a computer group are each designed to generate a data set which contains information with regard to a transaction and is designed to be incorporated into a chain of cryptographically interlinked data sets;
   at least one validation unit, which is designed to verify the data sets that shall be incorporated into the chain of cryptographically interlinked data sets, the validation unit being further designed to select a data set which was generated by a computing and communication unit of the computer group and to incorporate it into the chain of cryptographically interlinked data sets.

2. The system according to claim 1, wherein the transaction partners are assigned to different zones, at least one validation unit being assigned to each zone and preferably different validation units being assigned to the zones of the transaction partners.

3. The system according to claim 1, wherein the transaction partners are assigned to different zones, at least two validation units being assigned to each zone, a first validation unit being designed to verify the data sets that shall be incorporated into the chain of cryptographically interlinked data sets, and the at least one further validation unit being designed to check the first validation unit.

4. The system according to claim 1, wherein each computing and communication unit has in each case an encapsulated area, which either has an independent processor and an independent memory unit, or in that independent processor and memory areas are assigned to the encapsulated area.

5. The system according to claim 4, wherein the independent processor or the independent processor area is configured to calculate the data set.

6. The system according to claim 4, wherein the independent memory unit or the independent memory area is designed to store a chain of cryptographically interlinked data sets.

7. The system according to claim 1, wherein the at least one validation unit is authorized as a validation unit on account of an invested amount of a value carrier or a means of payment.

8. The system according to claim 1, wherein for performing the transactions between at least a first and at least a second transaction partner the computing and communication units are freely configurable via an interface.

9. The system according to claim 1, wherein each computing and communication unit is designed to generate a data set in parallel, and in that the validation unit is configured, on the basis of a consensus mechanism taking into account the data sets generated in parallel, to decide which data packet shall be incorporated into the chain of cryptographically interlinked data sets.

10. A method for performing transactions between at least a first and at least a second transaction partner by means of a system, which comprises a plurality of computing and communication units which are provided in locally distributed manner at a plurality of locations, each computing and communication unit being coupled to at least one measuring sensor and forming a smart meter gateway or being a part of a smart meter gateway for communication by the at least one measuring sensor with an information receiver, and the computing and communication units forming a computer group for performing a transaction, the method comprising the following steps:

generating at least one data set in each case by the computing and communication units of the computer group when a transaction is performed, the data set containing information about the transaction and being designed to be incorporated into a chain of cryptographically interlinked data sets;

verifying the data set that shall be incorporated into the chain of cryptographically interlinked data sets by at least one validation unit;

selecting a data set generated by a computing and communication unit of the computer group, and incorporating the selected data set into the chain of cryptographically interlinked data sets.

11. The method according to claim 10, wherein the step of verifying the data set that shall be incorporated into the chain of cryptographically interlinked data sets comprises that the validation unit decides, on the basis of a consensus mechanism taking into account the data sets generated in parallel, which data packet shall be incorporated into the chain of cryptographically interlinked data sets.

12. The method according to claim 10, wherein the validation unit is checked by at least one further validation unit and, in the event of faulty validation, loses an invested amount of a value carrier or a means of payment that was invested for the authorization as a validation unit.

13. The method according to claim 10, wherein the incorporation of the selected data set into the chain of cryptographically interlinked data sets comprises generating a cryptographically secured hash value of at least part of the data set immediately preceding it in the chain of data sets, a time stamp and information about the performed transaction.

14. The method according to claim 10, wherein the computing and communication unit has in each case an encapsulated area, which either has an independent processor and an independent memory unit, or in that independent processor and memory areas are assigned to the encapsulated area, and in that a chain of cryptographically interlinked data sets is stored in the independent memory unit or the independent memory area of the computing and communication unit.

* * * * *